United States Patent [19]

Wen

[11] Patent Number: 5,664,255
[45] Date of Patent: Sep. 2, 1997

[54] PHOTOGRAPHIC PRINTING AND PROCESSING APPARATUS

[75] Inventor: Xin Wen, Rochester, N.Y.

[73] Assignee: Eastman Kodak Company, Rochester, N.Y.

[21] Appl. No.: 654,945

[22] Filed: May 29, 1996

[51] Int. Cl.$^6$ .............................. G03D 5/04; G03B 27/52
[52] U.S. Cl. .................. 396/627; 355/27; 346/107.1; 396/604; 396/564; 396/642
[58] Field of Search .................. 396/2, 429, 564, 396/604, 627, 30, 42, 642; 355/27, 28, 100, 106; 346/107.1, 107.4

[56] References Cited

U.S. PATENT DOCUMENTS

| | | |
|---|---|---|
| 3,143,943 | 8/1964 | Townley et al. . |
| 3,264,961 | 8/1966 | Tuttle et al. . |
| 3,528,355 | 9/1970 | Blackert . |
| 3,671,120 | 6/1972 | Kuehnle . |
| 4,723,151 | 2/1988 | Sonezaki et al. . |
| 5,113,351 | 5/1992 | Bostic ........................... 364/479 |
| 5,121,131 | 6/1992 | Bouldin et al. . |
| 5,452,050 | 9/1995 | Ishikawa et al. ............... 355/27 |
| 5,477,301 | 12/1995 | Earle et al. . |
| 5,550,627 | 8/1996 | Dowler et al. ................. 355/27 |

FOREIGN PATENT DOCUMENTS 1040861  9/1966  United Kingdom .

OTHER PUBLICATIONS

"The Grand Alliance in Flat Panels", *Business Week*, Aug. 28, 1995, pp. 73–74.

*Primary Examiner*—A. A. Mathews
*Attorney, Agent, or Firm*—Frank Pincelli

[57] ABSTRACT

A method and apparatus for exposing and developing the photographic material at a single workstation. The apparatus comprises a digital device for exposing a photographic material located at a workstation and a developing mechanism for developing the photographic material at the same workstation.

15 Claims, 7 Drawing Sheets

PHOTOGRAPHIC PRINTING AND PROCESSING APPARATUS

FIELD OF THE INVENTION

The present invention relates to the field of digital printing and processing of a photographic material.

BACKGROUND OF THE INVENTION

Conventional photographic printers and processors typically involve an optical printing system where an image is exposed optically onto a photosensitive material, such as photosensitive paper, and then the photosensitive paper is passed through a plurality of processing tanks where the image exposed is developed by typical photographic processing chemicals.

There has been suggested in the prior art a coupling together of a digital laser printer with a conventional processor, such as illustrated in U.S. Pat. No. 4,723,151. However, this reference is directed to processing of x-ray films as opposed to color silver halide photosensitive material. Further, in order to write a color image onto a conventional photographic material using a laser technique, it requires a complex three-channel laser system. This laser printing technique is very expensive. Additionally, the system still requires use of conventional processing techniques, thus the overall system requires a substantial amount of expense and requires the use of substantial amounts of space at the facility.

There has also been suggested in U.S. patent application Ser. No. 08/628,071, filed Apr. 4, 1996, entitled "Stand Alone Photofinishing Apparatus", by Mark M. Meyers, the use of a digital printing system in combination with a low volume photographic processing system. While this does provide a relatively compact printing processing apparatus, it still requires the maintenance and control of various processing solutions and replenishment agents.

Applicants have invented a unique digital printing and processing apparatus which eliminates the need of separate processing tanks and also is relatively compact in physical size, as well as being relatively simple in construction, thus reducing the overall costs. Additionally, the system is such that it can be left alone for long periods of time without any substantial chemical degradation of stored chemicals, thus lending itself to being used as a stand alone customer interactive device.

SUMMARY OF THE INVENTION

In one aspect of the present invention there is provided a method for exposing and developing the photographic material at a single workstation. The method comprising the steps of:

a) exposing a photographic material at a single workstation using a digital exposure means; and b) developing said photographic material at said workstation.

In another aspect of the present invention there is provided an apparatus for exposing and developing the photographic material at a single workstation. The apparatus comprises a digital device for exposing a photographic material located at a workstation and a developing mechanism for developing the photographic material at the same workstation.

DESCRIPTION OF THE DRAWINGS

In the detailed description of the preferred embodiment presented below, reference is made to the following accompanied drawings in which:

FIG. 4b is an internal schematic diagram of the apparatus of FIG. 4a;

DETAILED DESCRIPTION OF THE INVENTION

Figure 1:
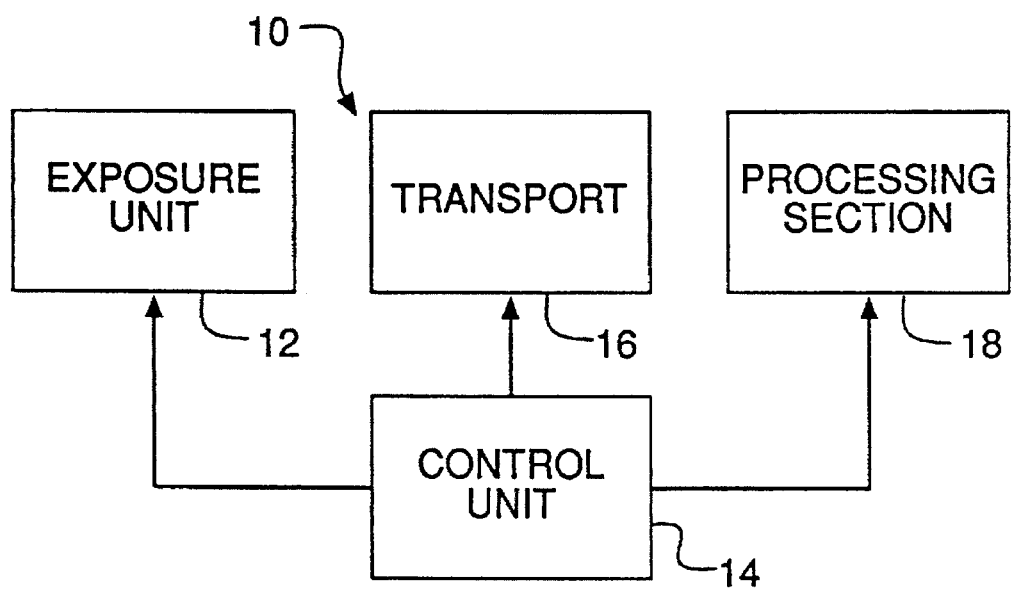
FIG. 1 is a schematic diagram of a conventional prior art printing processing apparatus.

Referring to FIG. 1, there is illustrated in diagrammatic form a prior art apparatus 10 for exposing and printing of a photosensitive material. In particular, apparatus 10 comprises an exposure unit 12 which typically involves the use of an optical exposing system for exposing of a photosensitive material, for example, exposing images from a photographic film onto a photographic paper. The apparatus 10 includes a control unit 14 (such as a computer) for controlling operation of the apparatus 10 and its various subsystems as described herein. A transport mechanism 16 transports the exposed photographic paper to the processing section 18 where the exposed photographic paper is developed. Thereafter, the photographic paper is passed out of the apparatus 10, packaged, and returned to the customer.

Figure 2:
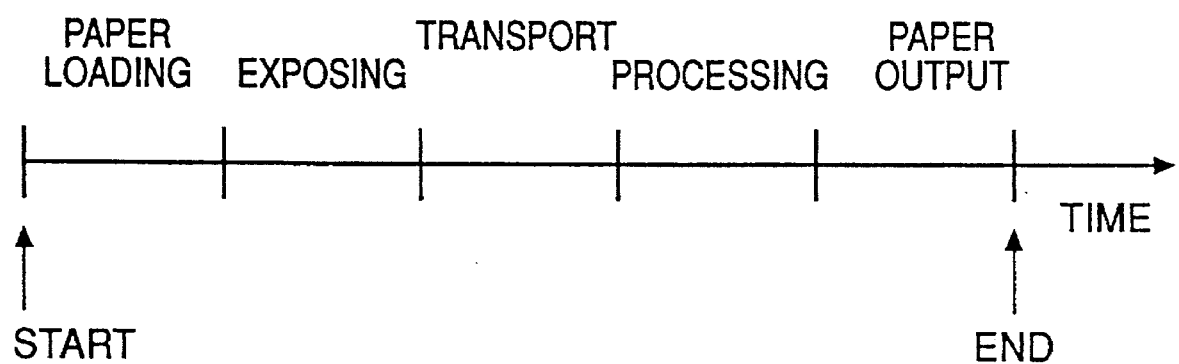
FIG. 2 is a timeline diagram indicating the steps required in a typical prior art apparatus.

FIG. 2 illustrates a timeline of the operation of the apparatus 10. The process starts by the loading of the photographic paper into the apparatus and moving the photographic paper to an exposure station whereby the images from a film are exposed onto the photographic paper. After the paper has been exposed, as previously discussed, the transport mechanism moves the photographic paper to the processing section where it is processed. The developer paper is then outputted out of the apparatus 10.

Figure 3:
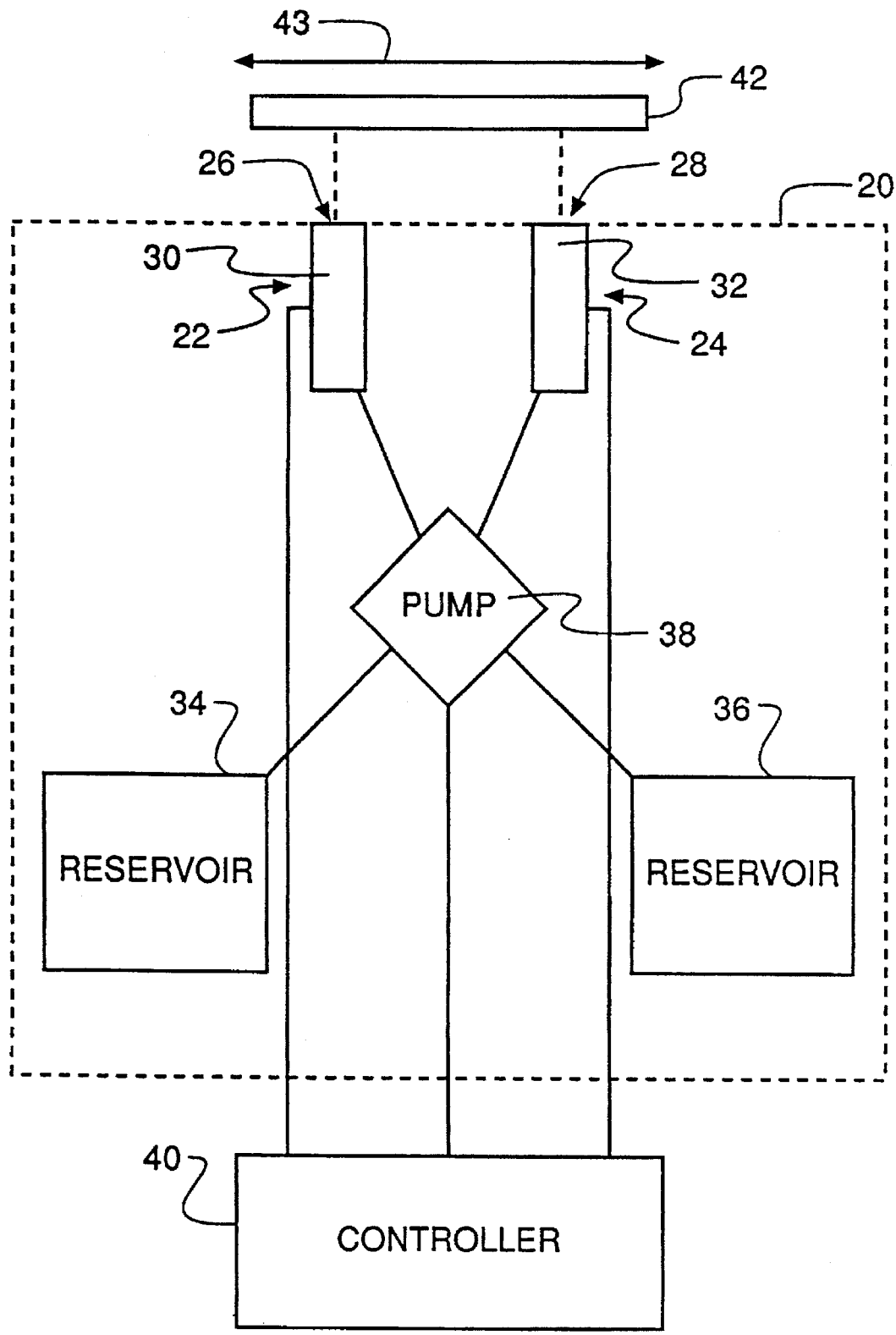
FIG. 3 is a schematic diagram of a prior art system used to process an exposed photographic material.

Referring to FIG. 3, there is illustrated a schematic block diagram of an apparatus 20 constructed in accordance with the prior art whereby photosensitive processing solution is sprayed onto a photosensitive material for development. The apparatus 20 includes two inkjet heads 22,24, each having an orifice 26,28 and a pulse solenoid control valve 30,32, respectively. Each head 22,24 is connected to a respective reservoir 34,36 containing processing solution. A pump unit 38 pumps solution from the reservoirs 34,36 to the appropriate head 22,24. A controller 40 is provided for controlling operation of the various components of the apparatus 20. The apparatus 20 is arranged to apply the various processing solutions to photographic material 42. This is accomplished by moving the inkjet unit over the surface of the photographic material 42 as indicated by arrow 43. This can be also accomplished by moving the photographic material relative to the inkjet unit.

Figure 4A:
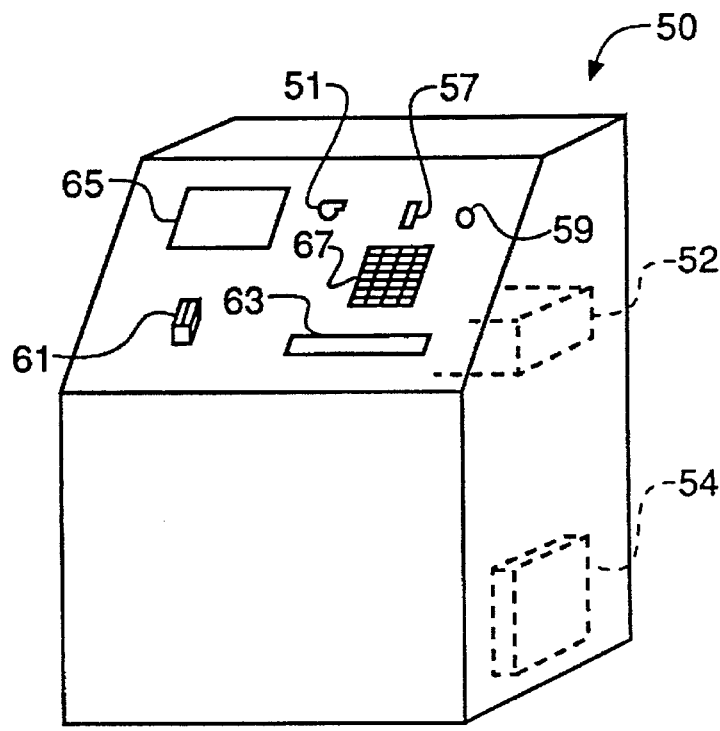
FIG. 4a is a schematic diagram of an apparatus made in accordance with the present invention.
Figure 4B:
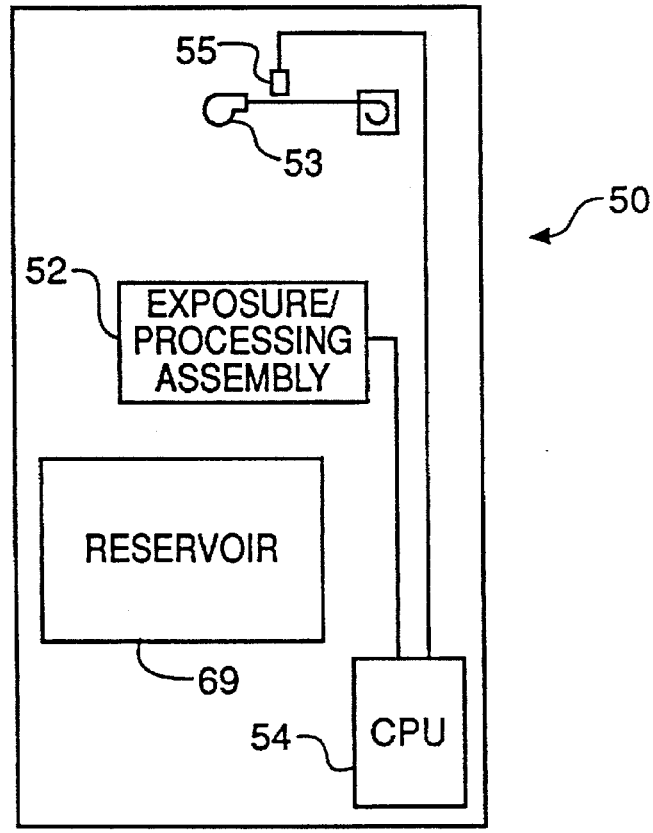
Figure 5:
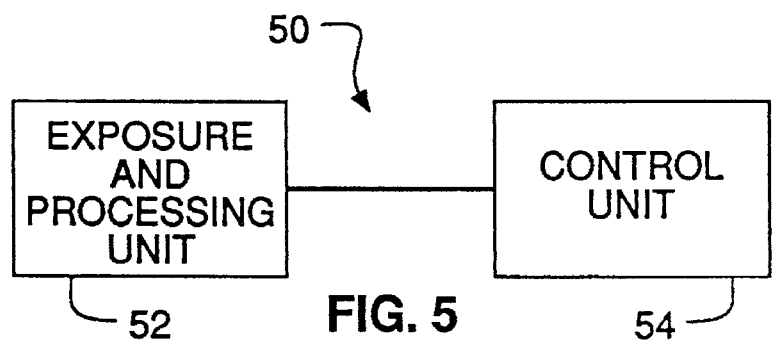
FIG. 5 is a flow diagram of the apparatus of FIG. 4.

Referring to FIGS. 4a and 4b, there is illustrated in schematic form an apparatus 50 made in accordance to the present invention. The apparatus 50 includes an exposure/ processing assembly 52 which is provided at a single processing station. An appropriate control unit 54 (such as a computer), is provided for controlling operation of the apparatus 50. FIG. 5 illustrates a schematic block diagram of the apparatus 50. An input opening 51 is provided for inserting developed film into the apparatus 50 for printing. In the particular embodiment illustrated, opening 51 is designed to receive a thrust film cartridge 53 such as described and disclosed in U.S. Pat. No. 4,834,306. The film is thrust out of the cartridge 53 and is scanned by scanner 55 which produces a digital record of the images developed on the film and which are to be printed by the apparatus 50. The digital record is forwarded to the CPU 54 which is later sent to the printer for printing It is to be understood that the images to be printed may be obtained from any source that can provide images in digital form, for example, by computer disc through slot 57 or transmission from a digital source such as a computer to serial port 59. The apparatus further includes an exposure/processing assembly 52 for printing and developing of an image onto a photographic material and development of the material. In the embodiment illustrated apparatus 50 further includes a payment mechanism 61 for accepting payment from the user and an order delivery mechanism 63 for delivering of completed print orders. A display screen 65, such as a CRT, is provided for displaying of information or instructions to the user and a key pad 67 is provided for entering of order information by the user. A reservoir section 69 is provided for holding processing chemicals which are to be supplied to exposure/ processing assembly 52.

Figure 6:
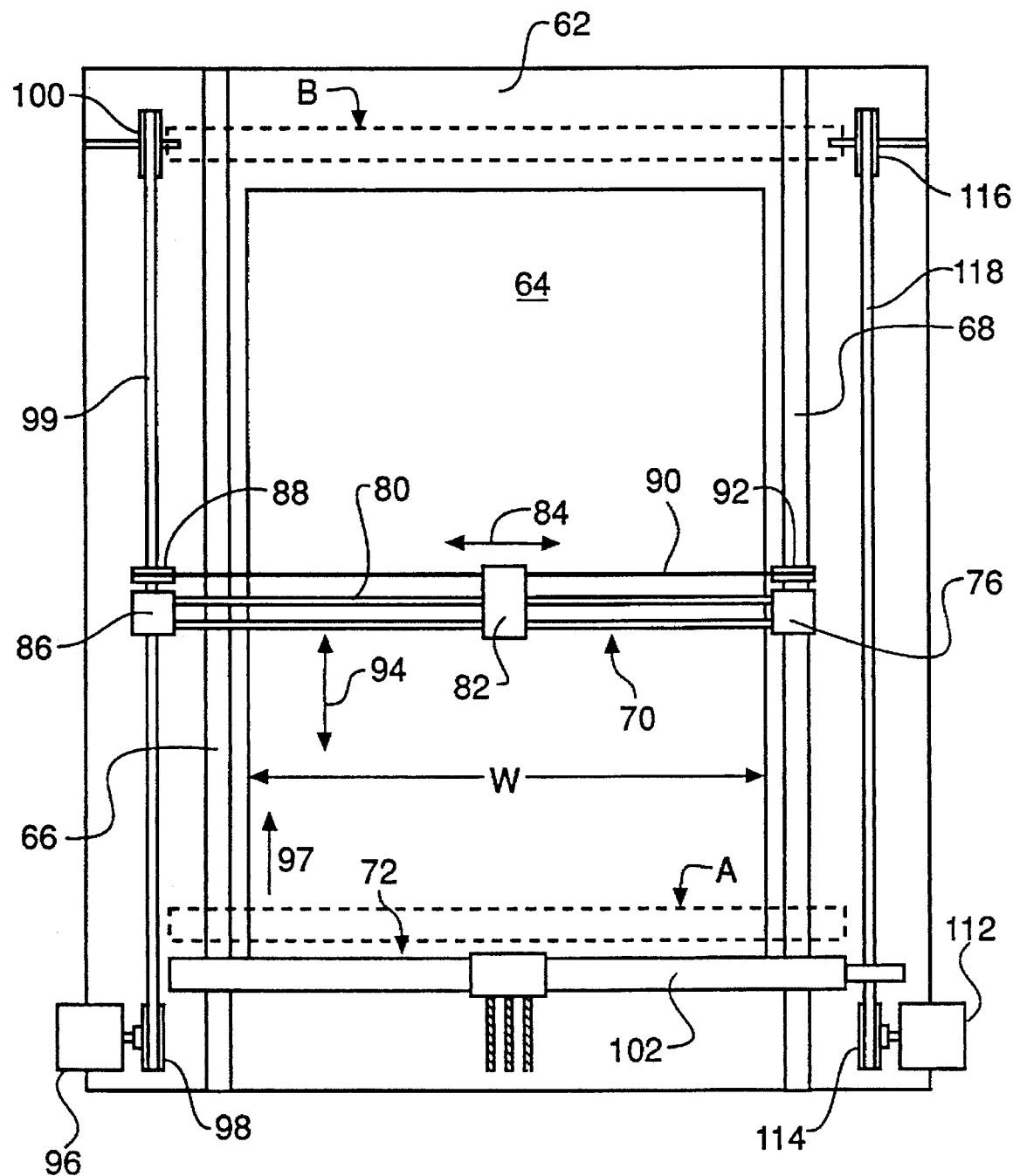
FIG. 6 is a top plan view of the exposing and processing unit of FIGS. 4a and 4b.

Referring to FIG. 6, there is illustrated in further detail the exposure/processing assembly 52 of apparatus 50. The exposure/processing assembly 52 comprises a single processing workstation 60, which includes a support platen 62, which is designed to hold and support a photographic material 64 placed thereon. In the particular embodiment illustrated, the photographic material 64 is a cut sheet of photographic paper which has been exposed but not developed. However, it should be understood that any other type photographic material may be placed at the workstation 60. The photographic paper 64 is positioned on the platen 62 by any appropriate means, for example, manually and/or automatically, if desired.

The workstation 60 includes a pair of parallel support guide rails 66,68 which are designed to support an exposure assembly 70 and processing assembly 72.

The exposure assembly 70 includes a guide bearing 76 which is slidably mounted to guide rail 68 so that it can move along the length thereof. The exposure assembly 70 also includes a support cross-member 80 which supports an exposure head 82, which is used to expose the photographic paper 64. The exposure head 82 is mounted to support member 80 for axial movement there along in the direction indicated by arrow 84. A motor 86 is provided on exposure assembly 70 and rotates pulley 88 secured thereto. A cable 90 is provided which is wrapped around a second pulley 92 spaced on the opposite end of member 80 which is secured to bearing 76 and pulley 88. The cable 90 is secured to the exposure head 82 by apparatus fastening means. Activating the motor rotates pulley 88 which moves cable 90 which in turn causes the head 82 to move along member 80. By rotating the motor 86 in the appropriate direction, the head 82 can be moved back and forth across material 64 as indicated by arrow 84.

A mechanism is provided for moving the exposure unit along the guide rails 66,68 as indicated by arrow 94. In the embodiment illustrated, this is accomplished by a motor 96 positioned at one longitudinal end of the platen 62 having a first pulley 98 secured to its rotating shaft and a second pulley 100 which is spaced from the first pulley 98 at the other end of platen 62. A cable or belt 99 is provided between pulleys 98,100 such that when motor 96 is activated it will cause the exposure assembly 70 to move in the direction indicated by arrows 94 as appropriate. The exposure assembly 70, in the embodiment illustrated, is designed to expose the photosensitive material using digital information which is representative of an image. For example, the printing head 82 comprises an LED printing system such as described in co-pending application U.S. Ser. No. 08/123, 839, filed Sep. 20, 1993, entitled "Method and Apparatus for Exposing Media with Multiple Light Sources", of Douglas H. Smith, John F. Carson, Roy F. Ference, and Karen J. Appel, which is hereby incorporated by reference. In particular, the system employs a digital multi-beam color exposure system which comprises an array of LEDs (light emitting diodes), which is located in the plane which is perpendicular to the optical axis of projection for imaging onto the photographic material 64. Thus, in order to provide an image on the photographic material 64, the exposure assembly 70 is placed at one end of the photographic paper, for example, at location A (shown in dash lines), and then is moved in the direction indicated by arrow 97 until it reaches the opposite end B (also shown in dash lines), while at the same time the exposure head 82 is moved back and forth across the photographic paper (side to side) so as to provide a raster scanner action so as to expose an image thereon obtained from a digital record file. After the entire image has been exposed onto the photographic paper 64, the exposure assembly 70 is held at position B.

The processing assembly 72 includes a spray bar 102 which is fluidly connected to various processing solutions contained in reservoir section 69 through tubes 104,106,108 for providing a processed solution in the appropriate sequential steps onto the photographic paper 64. An appropriate transport mechanism is provided for moving of the processing assembly 72 across the photographic material 64 at workstation 60. In particular, the transport mechanism includes a motor 112 located at the lower end of the workstation and has a pulley 114 secured to its drive shaft. A second pulley 116 is provided at the other opposite end. A belt 118 is wrapped around pulleys 114,116 and connected to processing assembly 72 such that the processing assembly 72 can be moved across the photographic material 64 as indicated by arrow 94. Activation of motor 112 is controlled by CPU 54, which is also used to control the operation of various other motors and exposure assembly 70.

Processing solution is provided to a spray bar which applies processing solution in much the same manner as described in U.S. Pat. No. 5,477,301. The spray bar sprays a mist of processing solution across the entire width W of the photographic material 64 as the assembly 72 is moved along the length L of the photographic paper 64 by motor 112. This is repeated until all appropriate processing solutions have been applied. Additional details may be found in U.S. Pat. No. 5,477,301.

Figure 7:
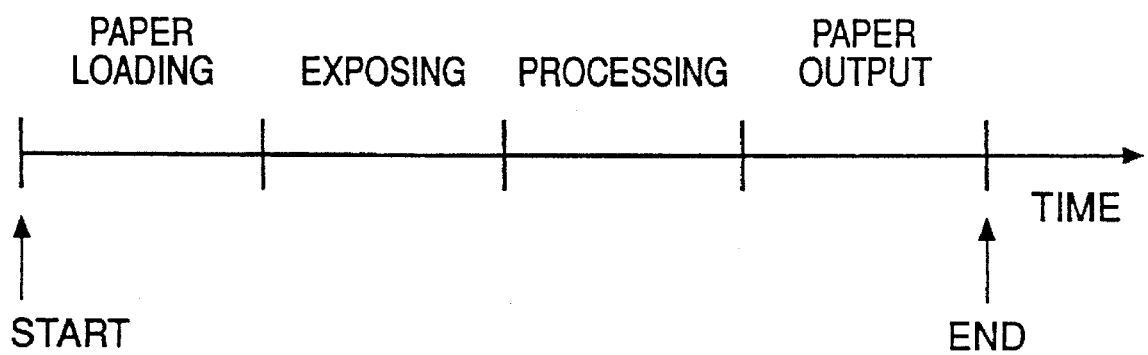
FIG. 7 is a timeline diagram of the processing steps of the apparatus of FIG. 5.

Referring to FIG. 7, there is illustrated the operation of the apparatus 50 using the workstation 60 illustrated in FIG. 6. In particular, photographic paper 64 is loaded at the workstation 60. Thereafter, the photographic material 64 is exposed by the exposure assembly 70. Preferably, as illustrated, the exposure assembly 70 will traverse the photographic paper 64 from position A to position B, while moving head 82 back and forth across the paper width W until completion of the exposure of the photographic material has occurred. The assembly 70 is left at position B, allowing the processing assembly 72 to then traverse the photographic paper 64 by appropriately activating motor 112. As the processing assembly 72 traverses the photographic paper 64, appropriate processing solutions are sprayed onto the photographic paper. The processing unit is passed over the unit several times until all of the appropriate development solutions are applied. Alternately, a plurality of bars may be placed together such that they may traverse the photographic paper in a single pass. After processing has been completed, the paper 64 may then be removed from the workstation either manually or by automatic devices.

It can be seen from the foregoing that the present invention avoids any transport mechanism for transporting of the photographic paper from the exposure station to a development station. Further, as can be seen, the device is relatively simple in construction and compact in size. Further, since there are no processing tanks, there is no need to require specific controls for controlling the chemistry as is typically required in the prior art processors.

Figure 9:
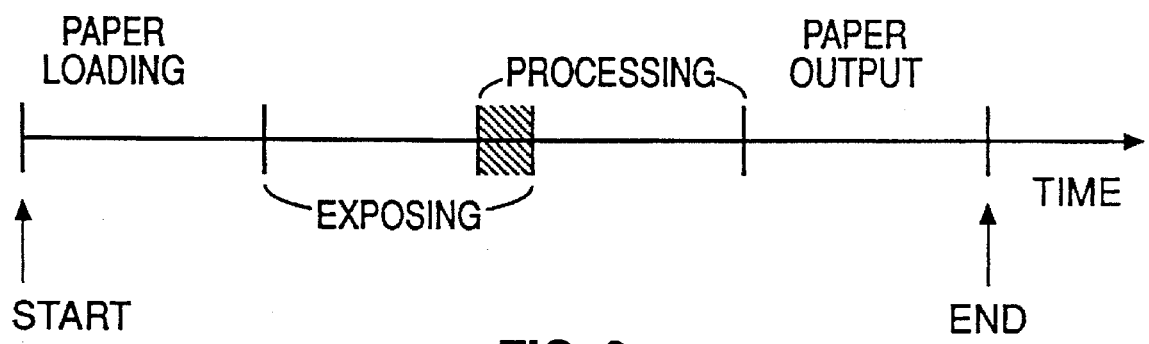
FIG. 9 is a timeline diagram of the operation of the apparatus illustrated in FIG. 8.
Figure 8:
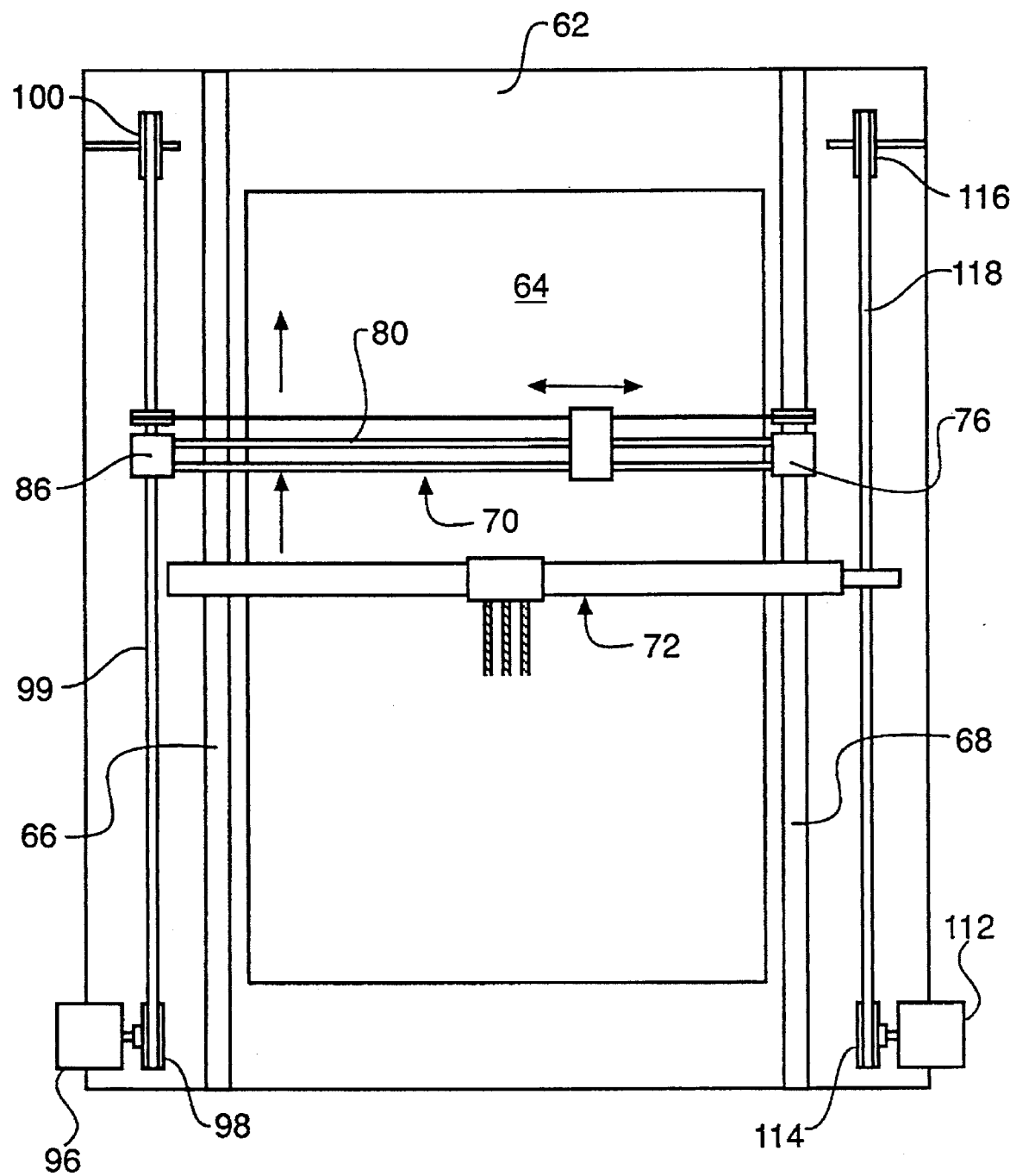
FIG. 8 is a top plan view of the modified exposure/scanning station of the apparatus of FIG. 5 illustrating simultaneous exposing and development of the photographic material.

Referring to FIG. 8, there is illustrated the apparatus of FIG. 6, except that in this embodiment the apparatus 50 is operated slightly different than that previously discussed. Instead of waiting until the entire photographic paper 64 is exposed, development starts before completion of exposure. Shortly after the exposure assembly 70 starts exposing the photographic material 64, the processing assembly 72 starts its pass over the photographic material 64, thus simultaneous exposing and developing of different sections of the photographic material. As illustrated in FIG. 9, there is an overlap in time between the exposure and processing, thus further reducing the time necessary from starting of the process to ending of the process.

Since there are no processing tanks through which the photographic material passes, the apparatus 50 can be designed to be a stand alone unit which can have appropriate customer interactive features, i.e., touchscreen for providing information for the apparatus and instructions to the user such that the apparatus may be used in an ATM mode where the customer can completely control operation. Additionally, there is no need for the complicated controlling of processing solutions as is typically required in photographic printers. Thus, the present invention provides a compact efficient device for exposing and printing of a photographic paper.

Figure 10:
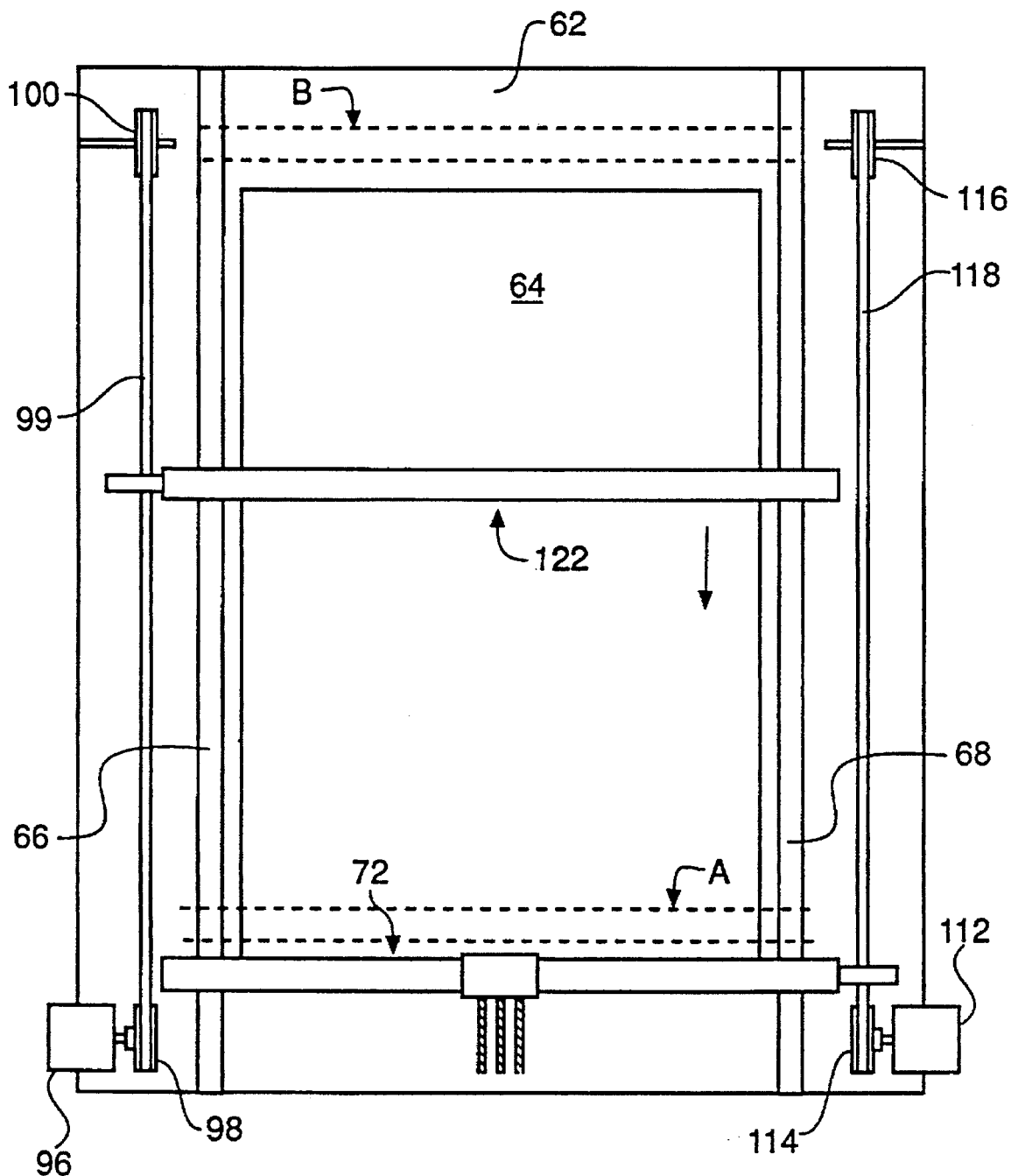
FIG. 10 is a top plan view of a modified exposure/printing station made in accordance with the invention.

Various changes may be made to the apparatus. For example, referring to FIG. 10, instead of using an exposure head that traverses back and forth across photographic paper, a linear exposure device 122 can be used such that an entire line across the photographic paper is exposed, thus allowing the elimination of motor 86 and the various components used to traverse the head across the photographic paper. The linear exposing device need only traverse the paper once from position A to position B to fully expose the paper. This would also further enhance the speed and operation of the device.

Additionally, various other digital exposing devices and techniques may be used to exposure the photographic material. For example, an active matrix liquid crystal display, field-emission display, electroluminescent display, plasma display and digital mirror devices.

It is to be understood that various other changes and modifications may be made without departing from the scope of the present invention, the present invention being limited by the following claims.

Parts List

10 ... apparatus
12 ... exposure unit
14 ... control unit
16 ... transport mechanism
18 ... processing section
20 ... apparatus
22,24 ... inkjet heads
26,28 ... orifice
30,32 ... pulse solenoid control valve
34,36 ... reservoir
38 ... pump unit
40 ... controller
42 ... photographic material
43 ... arrow
50 ... apparatus
51 ... input opening
52 ... exposure/processing assembly
53 ... thrust film cartridge
54 ... control unit
55 ... scanner
57 ... slot
59 ... serial port
60 ... workstation
61 ... payment mechanism
62 ... support platen
63 ... order delivery mechanism
64 ... photographic material
65 ... display screen
66,68 ... support guide rails
67 ... key pad
69 ... reservoir section
70 ... exposure assembly
72 ... processing assembly
76 ... guide bearing
80 ... support cross-member
82 ... exposure head
84 ... arrow
86,96 ... motor
88,92 ... pulley
89,94,97 ... arrow
90 ... cable
98,100 ... pulley
99 ... belt
102 ... spray bar
104,106,108 ... tubes
112 ... motor
114,116 ... pulley
118 ... belt
122 ... linear exposure device

I claim:

1. A method for exposing and developing the photographic material at a single workstation, comprising the steps of:
   a) exposing a photographic material at a single workstation using a digital exposure means; and
   b) developing said photographic material used to apply at least one processing solution at said workstation without transporting of the photographic material between exposing and developing of said photographic material.

2. A method according to claim 1 wherein said exposing of a photographic material at a single workstation comprises the raster scanning of a digital exposure head across the photographic paper.

3. A method according to claim 1 wherein said exposing of said photographic material comprises the use of a single linear array which is moved along the photographic material such that the photographic material may be exposed by a single pass.

4. A method according to claim 2 wherein said digital exposure means comprises an LED exposure head.

5. A method according to claim 1 wherein said digital exposure comprises use of one of the following types: active matrix liquid crystal display, a filled-emission display, an electroluminescent display, a plasma display, and a digital mirror device.

6. A method according to claim 1 wherein said development of said photographic material starts prior to complete exposure of said photographic material.

7. A method according to claim 1 wherein said development unit comprises a spray bar which applies said photographic solution along the entire width of said photographic material.

8. A method according to claim 1 wherein said digital exposure may be selected from any of the following: an active matrix liquid crystal display, a field-emission display, a electroluminescent display, a plasma display and a digital mirror device.

9. An apparatus for exposing and developing the photographic material at a single workstation without transporting of the photographic material between exposing and developing of said photographic material, comprising:

a) means for digitally exposing a photographic material at said single workstation; and b) means for developing said photographic material with at least at said single workstation.

10. An apparatus according to claim 9 wherein said means for digitally exposing said photographic material comprises an LED exposure head which is rastor scanned across said photographic paper.

11. An apparatus according to claim 9 wherein said means for digitally exposing said photographic material comprises a digital linear display device.

12. An apparatus according to claim 9 wherein said means for digitally exposing said photographic material comprises a two dimensional display device.

13. An apparatus according to claim 12 wherein said two dimensional display device comprises one of the following: an active matrix liquid crystal display, a field-emission display, an electroluminescent display, a plasma display and a digital mirror device.

14. An apparatus according to claim 9 wherein means for developing said photographic material comprises a spray bar which extends across said photographic paper.

15. An apparatus according to claim 9 wherein said apparatus further comprises means for allowing developing of said photographic paper prior to completion of digitally exposing the photographic material.

* * * * *